United States Patent [19]
Rudy

[11] Patent Number: 5,531,972
[45] Date of Patent: Jul. 2, 1996

[54] STAGED THREE-WAY CONVERSION CATALYST AND METHOD OF USING THE SAME

[75] Inventor: Wayne M. Rudy, Morristown, N.J.

[73] Assignee: Engelhard Corporation, Iselin, N.J.

[21] Appl. No.: 647,908

[22] Filed: Jan. 30, 1991

Related U.S. Application Data

[62] Division of Ser. No. 433,890, Nov. 8, 1989, Pat. No. 5,010,051.

[51] Int. Cl.$^6$ ............ B01D 53/92; B01D 53/56; B01D 53/62; B01D 53/72
[52] U.S. Cl. .......... 423/212; 423/213.7; 423/213.5
[58] Field of Search ............ 423/213.7, 213.5, 423/213.2, 212 C, 212 R; 502/304, 332, 334, 527, 351, 339

[56] References Cited

U.S. PATENT DOCUMENTS

| | | | |
|---|---|---|---|
| 2,664,340 | 12/1953 | Houdry | 423/213.5 |
| 3,086,839 | 4/1963 | Bloch | 423/212 |
| 3,375,059 | 3/1968 | Gerhold | 423/212 |
| 3,397,034 | 8/1968 | Tulleners et al. | 423/213.5 |
| 3,656,915 | 4/1972 | Tourtellotte | 423/213.7 |
| 3,741,725 | 6/1973 | Graham | 423/213.7 |
| 3,755,534 | 8/1973 | Graham | 423/213.7 |
| 3,825,654 | 7/1974 | Kobylinski et al. | 423/213.7 |
| 3,840,471 | 10/1974 | Acres | 502/334 |
| 3,896,616 | 7/1975 | Keith et al. | 60/284 |
| 3,993,572 | 11/1976 | Hindin et al. | 502/304 |
| 4,071,600 | 1/1978 | Schlatter et al. | 423/213.7 |
| 4,091,072 | 5/1978 | McArthur | 423/213.5 |
| 4,171,288 | 10/1979 | Keith et al. | 423/213.5 |
| 4,289,737 | 9/1981 | Acres et al. | 423/213.5 |
| 4,448,756 | 5/1984 | Hammerle et al. | 423/213.5 |
| 4,483,691 | 11/1984 | McShea et al. | 48/202 |
| 4,552,733 | 11/1985 | Thompson et al. | 423/213.5 |
| 4,587,231 | 5/1986 | Sawamura et al. | 502/304 |
| 4,675,308 | 6/1987 | Wan et al. | 502/304 |
| 4,678,770 | 7/1987 | Wan et al. | 423/213.5 |
| 4,701,312 | 10/1987 | Kice | 423/213.7 |
| 4,714,694 | 12/1987 | Wan et al. | 502/334 |
| 4,727,052 | 2/1988 | Wan et al. | 502/304 |
| 4,738,947 | 4/1988 | Wan et al. | 423/213.5 |
| 4,757,045 | 7/1988 | Turner et al. | 423/213.5 |
| 4,806,519 | 2/1989 | Chiba et al. | 502/304 |
| 4,828,807 | 5/1989 | Domesle et al. | 423/213.7 |
| 4,849,399 | 7/1989 | Joy et al. | 502/334 |
| 4,863,707 | 9/1989 | McShea et al. | 502/527 |

FOREIGN PATENT DOCUMENTS

| | | |
|---|---|---|
| 0313434 | 4/1989 | European Pat. Off. . |
| 2072561 | 9/1971 | France . |
| 2321940 | 3/1977 | France . |
| 262745 | 11/1987 | Japan . |
| 1384248 | 2/1975 | United Kingdom . |

*Primary Examiner*—Wayne A. Lange
*Assistant Examiner*—Peter T. DiMauro

[57] ABSTRACT

A catalyst composition has an upstream stage and a downstream stage, the upstream stage containing a catalytic material which is different from the catalytic material contained on the downstream stage and is characterized by having a low ignition temperature, e.g., 350° C. to less than 400° C. for the substantially simultaneous conversion of HC, CO and $NO_x$ pollutants contained in, e.g., the exhaust of an automobile engine operating at a substantially stoichiometric air-to-fuel weight ratio. The downstream catalytic material is characterized by having a higher conversion efficiency for substantially simultaneous conversion of HC, CO and $NO_x$ than the upstream catalytic material at elevated operation temperatures which may be, for example, from about 400° to 800° C. The method of the invention includes passing a gaseous exhaust stream containing HC, CO and $NO_x$ pollutants sequentially through first the upstream and then through the downstream catalytic materials.

10 Claims, 1 Drawing Sheet

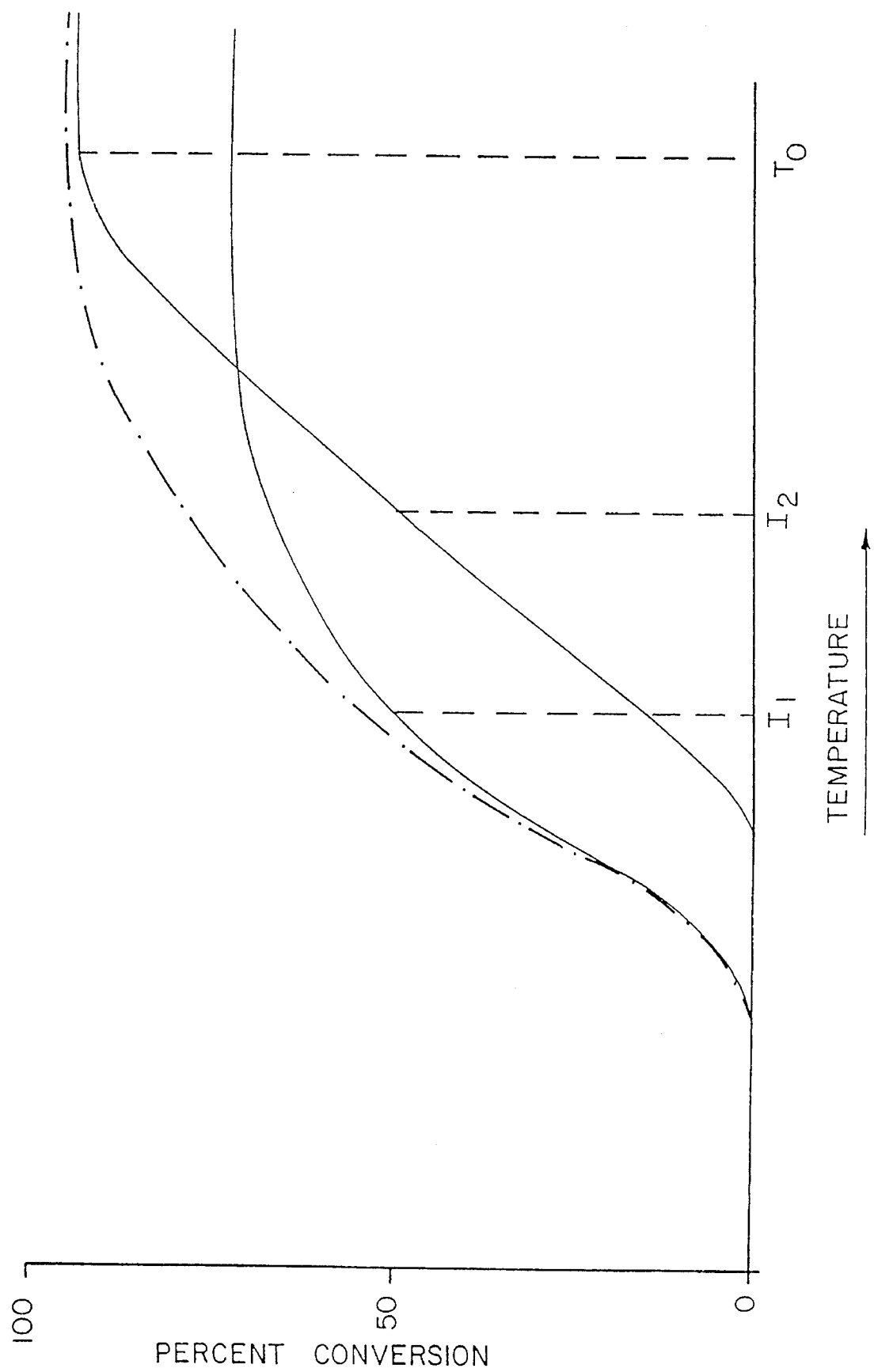

STAGED THREE-WAY CONVERSION CATALYST AND METHOD OF USING THE SAME

This is a divisional of application Ser. No. 07/433,890, filed on Nov. 8, 1989, now U.S. Pat. No. 5,010,051.

BACKGROUND OF THE INVENTION

1. Field of the Invention

The present invention is concerned with catalysts useful for the treatment of gases to reduce contaminants contained therein. More specifically, the present invention is concerned with improved catalysts of the type generally referred to as "three-way conversion" or "TWC" catalysts. TWC catalysts are polyfunctional in that they have the capability of substantially simultaneously catalyzing both oxidation and reduction reactions, such as the oxidation of hydrocarbons and carbon monoxide and the reduction of nitrogen oxides. Such catalysts find utility in a number of fields, including the treatment of the exhaust gases from internal combustion engines, such as gasoline-fueled automobile and other spark-ignition engines.

2. Background and Related Art

In order to meet governmental emissions standards for unburned hydrocarbons, carbon monoxide and nitrogen oxide contaminants in vehicle and other engine exhaust gases, so-called catalytic converters containing suitable catalysts are emplaced in the exhaust gas line of internal combustion engines to promote the oxidation of unburned hydrocarbons ("HC") and carbon monoxide ("CO") and the reduction of nitrogen oxides ("$NO_x$") in the exhaust gas. Two separate catalyst members or beds can be used in series, for example, the first to promote reduction of $NO_x$ and the second to promote oxidation of HC and CO, with optional oxygen (air) introduction between the beds. Alternatively, a single bed TWC catalyst, which substantially simultaneously promotes both oxidation and reduction as described above, may be used, provided that the air-to-fuel weight ratio ("A/F ratio") of the engine whose exhaust is being treated is held close to the stoichiometric ratio. For the foregoing purpose, catalysts comprising one or more platinum group metals and, optionally, base metal oxides distended upon a high surface area, refractory oxide support are well known in the art. The support may comprise a high surface area alumina coating carried on any suitable carrier such as a refractory ceramic or metal honeycomb structure, as well known in the art. For example, see Thompson at al U.S. Pat. No. 4,552,733. Such high surface area alumina materials are generally referred to in the art as "gamma alumina" (although it is usually a mixture of the gamma and delta phases and may also contain eta, kappa and theta phases) or "activated alumina". Such alumina, when fresh, typically exhibits a BET surface area in excess of 60 square meters per gram ("$m^2/g$"), often up to about 200 $m^2/g$ or more. It is a known expedient to stabilize such activated alumina supports against thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides. For example, see C. D. Keith et al U.S. Pat. No. 4,171,288.

It is known in the art to provide two catalyst members in series to treat noxious pollutants in an exhaust gas. For example, U.S. Pat. No. 3,896,616 of C. D. Keith et al discloses an arrangement for treating exhaust gases from internal combustion engines in which an initial catalyst of relatively small volume is placed as close to the exhaust manifold of the engine as possible with a second, larger volume catalyst positioned further along the exhaust pipe beneath the vehicle. The small volume of the initial catalyst and the higher temperature of the exhaust gases closer to the engine cause the initial catalyst to heat up very quickly, thereby commencing purification of the exhaust gas during the start-up period when the downstream catalyst, because of its lower operating temperature, is still relatively ineffective. The Patent discloses that the art has contemplated by-passing the initial catalyst after the subsequent or downstream catalyst is heated to operating temperature (see column 3, lines 4–19). However, the Patent teaches continuing operation of the initial catalyst after the engine start-up period in order to reduce the amount of nitrogen oxides in the engine exhaust gas. In order to accomplish this result, an additional, extraneous fuel is introduced between the initial and subsequent catalysts. (Column 4, line 34 et seq.) The initial catalyst may also be supplied, during the engine start-up period, with either a fuel or an oxygen-containing gas, depending on operating conditions. (See column 4, lines 3–24.)

As disclosed at column 9, line 22–46 of the Patent, the initial catalyst may comprise an activated alumina support in which one or more platinum group metals, preferably including a catalytically effective amount of palladium, are disposed. The subsequent catalyst is disclosed as of similar composition, comprising one or more platinum group metals, especially platinum or palladium, and other ingredients such as base metals including iron group metals. (See column 12, lines 21–35.)

German Offenlegungsschrift 36 08 292 A1, A. Konig et al discloses a catalytic converter for treating internal combustion engine exhaust comprising a first converter (5) containing a multifunction catalyst and a second converter (6) with a nitrogen oxide reducing catalyst, and including the introduction of air via line 7 between the catalyst stages. The Patent discloses a system in which the second converter is a $NO_x$ reduction catalyst, for example a zeolite or coke support containing a base metal oxide, such as titania or vanadia, disposed thereon. The up-stream catalyst is a conventional three-way conversion catalyst and, in accordance with the invention, $NO_x$ and ammonia emanating from the first catalyst are converted in the second catalyst. The publication discusses that in retrofitting automobiles which do not contain oxygen sensor probes and other equipment necessary to control the air-to-fuel ratio within the narrow range necessary for good conversion rates using a three-way conversion catalyst, the disclosed arrangement provides a means for converting the nitrogen oxides as well as ammonia which may emanate from the first catalyst, especially when the air-to-fuel ratio is not closely controlled. The second catalyst also advantageously contains an oxygen storage component, such as a zeolite, so that ammonia produced in the first converter during fuel-rich operation can be stored in the second converter and, other subsequent fuel-lean operation, be used for the reduction of nitrogen oxides.

SUMMARY OF THE INVENTION

In accordance with the present invention, there is provided a catalyst composition for converting HC, CO and $NO_x$ in a gaseous stream flowed therethrough. The composition comprises an upstream catalyst member and a downstream catalyst member, as sensed in the direction of flow of the gaseous stream through the catalyst composition. The upstream catalyst member comprises a first catalytic material characterized by having an ignition temperature for substantially simultaneous conversion of HC, CO and NO$_x$ which is lower than that of a second catalytic material. The downstream catalyst member comprises a second catalytic material characterized by having a higher conversion efficiency than the first catalytic material for substantially simultaneous conversion of HC, CO and N$_x$ at operating temperatures above the ignition temperature.

In another aspect of the present invention, the first catalytic material has, when the gaseous stream is a substantially stoichiometric exhaust gas mixture, an ignition temperature for substantially simultaneous conversion of HC, CO and NO$_x$ which is less than about 400° C., for example, 375° or 350° C. and the downstream catalyst member has for the gaseous stream treated by the upstream catalyst member a conversion efficiency of at least about 94% for substantially simultaneous conversion of HC, CO and NO$_x$ at an operating temperature of at least about 400° C.

Yet another aspect of the invention provides that the operating temperature range starts at about 400° C., for example, the operating temperature range may be from about 400° to 800° C.

In accordance with another aspect of the present invention, the first catalytic material may comprise a platinum catalytic component disposed on a refractory metal oxide support and a rhodium catalytic component disposed on a refractory metal oxide support. The second catalytic material may comprise a rhodium catalytic component disposed on a stet (i.e., a zirconia support impregnated with ceria) and a platinum catalytic component disposed on a refractory metal oxide support.

Yet another aspect of the present invention provides a catalyst composition as described above wherein the first catalytic material comprises a first platinum catalytic component dispersed on a first activated alumina support, a rhodium catalytic component dispersed on a second activated alumina support, and a second platinum catalytic component disposed on a ceria support. The second catalytic material comprises a second rhodium catalytic component dispersed on a zirconia/dispersed ceria support, a third rhodium catalytic component dispersed on a third activated alumina support, a third platinum catalytic component disposed on a fourth activated alumina support, and a fourth platinum catalytic component disposed on a ceria support.

In accordance with a method aspect of the present invention, there is provided a method of substantially simultaneously converting HC, CO and NO$_x$ pollutants contained in a gaseous stream. The method comprises the following steps. The gaseous stream is flowed through a first catalyst zone and therein the gaseous stream is contacted with a first catalyst member comprising a first catalytic material having an ignition temperature for substantially simultaneous conversion of HC, CO and NO$_x$, when the gaseous stream is a substantially stoichiometric exhaust gas mixture, which is lower than the corresponding ignition temperature of a second catalytic material, described below. The gaseous stream is introduced into the first catalyst zone at a temperature at or above the ignition temperature of the first catalytic material but below an operating temperature range, described below, to convert within the first catalyst zone some, but less than all, of each of the HC, CO and NO$_x$ content of the gaseous stream to innocuous substances. In this way, the temperature of the gaseous stream is increased, for example, it may be increased to within the operating temperature range. The gaseous stream from the first catalyst zone is then flowed to a second catalyst zone and is therein contacted with a second catalyst member which comprises a second catalytic material having a higher conversion efficiency (for substantially simultaneous conversion of HC, CO and NO$_x$) at temperature within the operating temperature range than does the first catalytic material. The gaseous stream is contacted with the second catalytic material at a temperature within the operating temperature range to substantially simultaneously convert at least some of the remaining HC, CO and NO$_x$ to innocuous substances, e.g., H$_2$O, CO$_2$ and N$_2$.

Other method aspects of the present invention include utilizing a 400° to 800° C. operating range temperature and utilizing as the catalyst composition catalyst compositions as described above.

As used herein and in the claims, reference to a "catalytic component" means and includes catalytically effective forms of the component, or precursors thereof, such as the elemental metal, an oxide or other compound or a complex of the metal, or an alloy or mixture including the metal, or a combination of any of the foregoing. For example, reference to a "platinum catalytic component" means a catalytically effective form of platinum or a precursor thereof, such as platinum metal, an oxide or some other platinum compound or complex, or an alloy or mixture including platinum, or a combination of any of the foregoing.

As used herein and in the claims, the "ignition temperature" of a catalyst is defined as the lowest temperature at which a stoichiometric exhaust gas stream introduced into the catalyst will undergo conversion of at least 50% of each of CO, HC and NO$_x$ contained in the stream. As used in this definition, a "stoichiometric exhaust gas stream" is the exhaust gas from a gasoline-fueled spark ignition automobile engine operated at a stoichiometric air to fuel ratio.

Still other aspects of the present invention are described in the following detailed description of the invention.

BRIEF DESCRIPTION OF THE DRAWING

The sole FIGURE of the drawing is a graph plotting on the abscissa (vertical axis) conversion efficiency for HC, CO and NO$_x$ against, on the ordinate (horizontal axis) temperature.

DETAILED DESCRIPTION OF THE INVENTION AND SPECIFIC EMBODIMENTS THEREOF

The design of a particular catalyst system, i.e., a catalytic converter, for the treatment of pollutants contained in automotive exhaust gases involves inherently conflicting requirements, inasmuch as both oxidation and reduction reactions must be promoted and a wide range of operating conditions must be accommodated. Accordingly, any given system necessarily requires compromises in order to attain a desired over-all performance of the catalytic converter system. For example, the catalyst composition used should become active at as low a temperature as possible, that is, it should have a desirably low "light-off" or "ignition" temperature in order that it become effective as soon as possible after start-up of a cold engine. During the start-up phase, before the exhaust gas and the catalytic converter are heated to a sufficiently high operating temperature, a large quantity of unconverted pollutants pass into the atmosphere through the catalyst. (In this regard, see the discussion contained in Keith et al U.S. Pat. No. 3,896,616, discussed above, especially at column 1, line 43 to column 2, line 25.) On the other hand, the catalytic converter utilized must also convert as high a proportion of the pollutants as possible when it attains normal operating temperature, that is, it must demonstrate good activity within the operating temperature range. It must also demonstrate acceptable durability, that is, it must maintain its activity and resist thermal degradation for at least 50,000 miles of high temperature operation. Further, a successful catalytic converter must be resistant to poisoning from lead found in small quantities even in unleaded commercially available fuels, as well as phosphorus which emanates from engine lubricating oil consumption. In addition, the ideal catalyst system must be able to demonstrate good activity and an acceptably low ignition temperature over a wide range of exhaust gas flow rates and compositions, the latter being determined in large part by the A/F ratio employed and varying conditions of load and operation. Thus, the catalytic converter system must react quickly to rapid changes in operating conditions and transient excursions in exhaust gas composition and temperature.

No single catalyst composition can optimize each of the desired attributes of the catalytic converter. As indicated by the above-described German Published Application 36 08 292 and Keith et al U.S. Pat. No. 3,896,616, attempts have been made to improve over-all performance by dividing the catalytic system into two stages or beds. In one case, the German reference provides a separate catalyst for oxidation and another catalyst for $NO_x$ reduction, and in the other case the Keith et al Patent places a portion of the catalyst in close physical proximity to the engine to take advantage of the higher exhaust gas temperatures available there.

Generally, the catalyst compositions of the present invention contain two stages, a first or "upstream" stage which is characterized by a catalyst having a good, that is, a low, ignition temperature followed by a second or "down-stream" stage characterized by a catalyst having good conversion efficiency at an elevated operation temperature relative to the ignition temperature. With this arrangement, the first stage of the catalyst becomes effective to convert HC, CO and $NO_x$ at the low temperatures obtaining before the engine and its exhaust attains an elevated operating temperature. The catalytic reaction thus commenced at a relatively low temperature in the first stage of the catalyst serves to quickly heat the first stage and then the second stage catalyst to an elevated operating temperature at which the second stage catalyst has a higher activity for conversion of HC, CO and $NO_x$ than does the first stage catalyst.

Generally, the first or "upstream" stage of the catalyst composition of the present invention may comprise a suitable catalyst demonstrating a low ignition temperature, that is, a catalyst which becomes effective at relatively low temperatures of the gas being treated to substantially simultaneously convert a stated proportion, e.g., at least 50%, of the original content of each of HC, CO and $NO_x$ in the gas supplied to the catalyst.

A suitable catalyst demonstrating a low ignition temperature comprises a catalytic material comprising a platinum catalytic component disposed on an activated alumina refractory support, a platinum catalytic component disposed on an alumina-stabilized bulk ceria support, and a rhodium catalytic component disposed on an activated alumina support. This upstream catalytic material may be disposed on a monolithic ceramic support, such as a cordierite support having a plurality of fine gas flow passages extending therethrough. As described in more detail below, this type of catalyst composition displays an excellent low ignition temperature for substantially simultaneous conversion of HC, HC, CO and $NO_x$. Thus this type of catalyst has been found too be capable of attaining at least 50% conversion for each of HC, CO and $NO_x$ at temperatures of less than 400° C. when treating a stoichiometric exhaust gas mixture. However, it displays lower conversion rates than some other catalyst compositions for such substantially simultaneous conversions at higher operating temperatures, for example, within an operating temperature range of from about 400° to 800° C.

An effective catalyst composition for utilization as the second or "downstream" stage of the catalyst composition, is a catalyst of the type disclosed in co-pending patent application of Samuel J. Tauster et al, filed concurrently with this application and entitled "Three-way Conversion Catalyst Including A Ceria-containing Zirconia Support". That application discloses that by utilizing in a catalytic composition a rhodium catalytic component dispersed upon a ceria-impregnated zirconia support, a catalyst of enhanced TWC efficacy is attained. The rhodium on ceria-impregnated zirconia is believed to promote both a water gas shift reaction, thereby promoting the oxidation of CO to carbon dioxide, as well as a steam reforming reaction, thereby promoting the reaction of saturated hydrocarbons (HC) with $H_2O$, to form hydrogen and carbon oxides.

There are teachings in the art that rhodium should not be utilized in TWC catalysts or the like in contact with rare earth metal oxides such as ceria, because of undesirable reaction between the rhodium and ceria, especially when lean (oxygen rich) conditions exist in the exhaust gas being treated. For example, see U.S. Pat. No. 4,727,052 of C. Z. Wan et al. As described at column 5, lines 1–36 of this patent, rhodium tends to react with rare earth metal oxides, including ceria, especially under high temperature conditions, and this has a deleterious effect on catalyst activity. In this regard, see also U.S. Pat. No. 4,678,770 of C. Z. Wan et al, the disclosure of which is hereby incorporated herein. However, in the case of the downstream stage catalyst used herein, the amount of ceria impregnated into the zirconia used is limited to not more than about 15 percent by weight, preferably not more than about 10 percent by weight ceria, expressed as the combined weight of the ceria and zirconia. By thus controlling the amount of ceria dispersed on the zirconia, it has been found that the adverse reaction between rhodium and ceria does not occur to any significant extent. Further, the presence of the ceria is believed to assist in retaining the rhodium crystallites in place on the zirconia support and in preventing or retarding sintering of the rhodium to form crystallites of undesirably large size. The controlled amount of ceria dispersed on the zirconia is believed to stabilize the catalyst by precluding or reducing sintering of the rhodium and, as indicated above, is believed to promote steam reforming and water gas shift reactions, thereby enhancing efficiency of the catalyst. Thus, the rhodium catalytic component is dispersed on a ceria-impregnated zirconia support containing a limited amount of ceria to provide a zirconia/dispersed ceria support. Although not wishing to be bound thereby, it is believed that the rhodium catalytic component on zirconia/dispersed ceria support also enhances the efficiency of the consumption of both hydrocarbons and carbon monoxide in the gaseous stream being treated.

The downstream stage catalyst compositions used in the present invention may also contain other catalytic components utilized for their known properties. For example, the downstream stage catalyst composition may also contain a second rhodium catalytic component supported conventionally on an alumina support, in order to maintain good activity for $NO_x$ reduction. Further, the downstream stage catalyst compositions may also contain a platinum catalytic component dispersed upon an activated alumina support. This component results in relatively large platinum crystallites being dispersed on the surface of the activated alumina and provides a catalytic component which is believed to have good efficiency for the oxidation of saturated hydrocarbons. A second platinum catalytic component dispersed on ceria, such as an alumina-stabilized cerium oxide support, as disclosed in U.S. Pat. No. 4,714,694 of C. Z. Wan et al, the disclosure of which is hereby incorporated herein, may also be included in the composition. This platinum catalytic component is believed to be dispersed as relatively small crystallites on the surface of the alumina stabilized ceria, thereby providing a catalytic component which is believed to have good efficiency for the oxidation of carbon monoxide and unsaturated hydrocarbons to carbon dioxide and $H_2O$.

One or both of the upstream and downstream catalyst compositions of the present invention may also contain a high-porosity refractory metal oxide which increases the over-all porosity of the catalytic material, as disclosed in U.S. Pat. No. 4,757,045 of M. E. Turner et al, the disclosure of which is hereby incorporated herein. For example, the catalytic material ("washcoat") may comprise a support including zirconia having a dispersed ceria phase thereon and an activated alumina support. The washcoat may also contain a minor amount of another refractory metal oxide of higher porosity than the support material, such refractory metal oxide serving to increase the porosity of the washcoat. As used herein and in the claims, a "minor" amount of the high-porosity refractory metal oxide means that the high-porosity refractory metal oxide comprises less than fifty percent by weight of the combined weight of the high-porosity refractory metal oxide and the refractory metal oxide supports (excluding the weight of catalytic components, such as platinum and rhodium) dispersed thereon. Usually the high-porosity refractory metal oxide will comprise only about 1 to 20 percent by weight, e.g., 5 to 10 percent by weight of the combined refractory metal oxides, on the same basis as above indicated. The high-porosity refractory metal oxide desirably has an accessible pore volume of greater than about 0.03 cubic centimeters per gram, a surface area of less than about 25 square meters per gram, and a pore size range such that at least about 35% of its pore volume is provided by pores having a diameter of at least 2000 Angstroms when the second metal oxide particles being measured for pore size are at least 44 microns in diameter. Pulverized cordierite is well-suited for the purpose.

The catalytic materials of both the upstream and downstream catalysts may be applied to any suitable substrate, for example, to a ceramic substrate such as a cordierite substrate comprising a plurality of cells which define fine, parallel gas flow passages extending from one face to the other of a cylindrical monolith member. Such substrates, which may also be made of refractory metals such as stainless steel, are sometimes referred to in the art as "honeycomb" or "monolithic" substrates. Alternatively, the catalyst compositions of the present invention may include a washcoat containing the above-described catalytic material dispersed on a particulate support made of a refractory ceramic material, such as pellets, spheres or extrudates of alpha alumina or the like.

When applying the catalytic materials to a monolith substrate, such as a cordierite substrate, it is also preferred to provide an initial undercoat of activated alumina. Activated alumina, when applied and calcined in the manner as described in the following Examples, provides a tough, adherent coating to the cordierite or other substrate. The catalyst materials are then applied as a second or topcoat over the undercoat. This not only provides better adherence of the catalytic material to the substrate when, for example, the washcoat comprises ceria, but, by supporting the topcoat on an undercoat consisting essentially of activated alumina, the metal catalytic components such as platinum and rhodium are made more accessible to the gas flowing through the cells of the substrate. That is, the gas can flow through the topcoat layer and into the undercoat, thereby providing enhanced passage and increased contact of the noxious components with the catalytic metals dispersed throughout the topcoat. The activated alumina undercoat may optionally be stabilized by a suitable thermal stabilizer such as ceria and/or other rare earth oxides and the topcoat may include a second, porous refractory metal oxide to enhance gas flow therethrough.

The upstream and downstream stages of the catalysts of the present invention may be contained on a single monolithic substrate or a single catalyst bed. Thus, a ceramic monolithic substrate may be partially submerged from one end thereof within a slurry containing the low-ignition temperature upstream catalyst material of the present invention, and subsequently partially submerged from its other end into a slurry of a catalytic material containing the high activity downstream catalytic material of the present invention. Alternatively, the upstream and downstream stages may comprise separate beds or separate, discrete monolithic substrates. Thus, the upstream catalyst member may comprise a discrete catalyst member separate from the downstream catalyst member and the upstream and downstream catalyst members may be spaced apart and separated from each other by an open gas-flow zone within which, as is known in the art, a turbulent condition may be restored to the flowing gases between the upstream and downstream stages.

Specific embodiments of the invention and utilization thereof are shown in the following Examples 1–3.

EXAMPLE 1

A catalyst denominated Catalyst I is a single-coat catalyst supported on a cordierite substrate. Catalyst I is made as follows.

A. An activated alumina powder, calcined at 950° C. for 2 hours and exhibiting a surface area of about 120 $m_2/g$, is placed in a one-half gallon ball mill to which is also added 240 milliliters ("ml") of distilled water, and the mixture is milled for 30 minutes at 60 revolutions per minute ("rpm"). An aqueous solution of the same MEA platinum hydroxide complex as used in Part B of Example 1 containing 3.675 grams of platinum, measured as the metal, was added to the ball mill and milling was continued for 60 additional minutes. At that time 12.5 ml of a 69 percent nitric acid solution was added to the ball mill and the milling was continued to reduce the particles to a particle size of less than 12 microns in diameter, to provide an aqueous slurry of alumina particles containing, on a dry basis, 1.47 percent by weight platinum, measured as the metal and based on the weight of platinum plus the alumina support.

B. A rhodium on alumina catalytic material is prepared by placing 250 grams of the same alumina powder as used in Step A into a half-gallon ball mill and adding 250 ml distilled water, then milling the resultant aqueous slurry for 30 minutes at 60 rpm. An aqueous solution of rhodium nitrate containing 1.64 grams of rhodium, measured as the metal, was then added to the ball mill and milling continued for 60 additional minutes. After that time, 12.5 ml of a 69 percent nitric acid solution was added to the mill, and milling was continued to reduce the particles to a particle size of less than 12 microns in diameter to provide a slurry of alumina particles containing on a dry basis 0.656 weight percent rhodium, measured as the metal and based on the weight of rhodium plus the alumina support.

C. Into a one-half gallon ball mill there was placed 250 grams of a ceria powder which had been stabilized with alumina, the powder containing on a dry basis 2.5 percent $Al_2O_3$ based on the total weight of ceria plus alumina. To the ball mill was added 240 ml of distilled water and the mixture was milled for 30 minutes at 60 rpm. A portion of the same aqueous MEA platinum hydroxide complex used in Part B of Example 1 and containing 3.675 grams of platinum, measured as the metal, was then added and milling was continued for 60 additional minutes. After that time, 12.5 ml of a 99 percent solution of acetic acid was added to the mill and milling was continued to reduce the particles to a size of less than 12 microns in diameter. The resultant slurry contained alumina stabilized ceria particles containing, in a dry basis, 1.47 percent by weight platinum, measured as the metal and based on the weight of platinum plus the ceria support.

D. The three slurries obtained in Steps A, B and C were blended to provide a coating slip containing, on a dry solids basis, 45 grams of the 0.656 percent rhodium on alumina, 31 grams of the 1.47 percent platinum on alumina, and 70 grams of the 1.47 percent platinum on alumina-stabilized ceria. Cordierite substrates were coated with the blended coating slip. The substrates were a cordierite honeycomb support manufactured by Corning Glass Works and having 400 cells per square inch (62 cells per square centimeter) of face area extending therethrough, the cells being of substantially square cross section. The substrate was oval in cross section, measured 7.19 centimeters in length and its faces measured 8.4 by 14.8 centimeters. The ceria-stabilized alumina was applied by dipping the substrate into an aqueous slurry of the stabilized alumina solids. The substrates were dipped into the blended slurry and excess slurry was blown from the cells (passageways). The coated substrates were then dried in air at 100° C. for 16 hours and then calcined in air at 450° C. for 1 hour to provide a substrate containing about 1.91 grams per cubic inch of the dried and calcined coating slip (the "washcoat"). The catalyst therefore contained about 0.9 grams of catalytic metal-containing ceria and 1.01 grams of catalytic metal-containing alumina per cubic inch of catalyst. The resultant Catalyst I comprised platinum supported on alumina-stabilized ceria, platinum supported on alumina, and rhodium supported on alumina. Catalyst I contains 40 g/ft³ of precious metal (platinum and rhodium) with a Pt to Rh weight ratio (as metal) of 5.0.

EXAMPLE 2

A catalyst having an undercoat adhered to a substrate and a catalytic topcoat applied thereto Is denominated Catalyst II and is prepared as follows.

I. The Undercoat.

A. The undercoat is prepared by impregnating an activated alumina powder with an aqueous solution of cerium nitrate, then spray-drying the impregnated powder in air at 400° F. (204° C.) and calcining the dried powder in air at 900° C. The resultant material contained 5% by weight cerium oxide (as $CeO_2$) as a thermal stabilizer for the alumina and had a surface area of about 130 square meters per gram ("m²/g"). This ceria-stabilized, activated alumina frit was then coated onto a monolith substrate of the type used in Part D of Example 1 to give a loading of 1.5 grams per cubic inch ("g/in³") of ceria-stabilized alumina. Excess slurry was blown from the cells with compressed air, and the thus coated substrates were dried and then calcined in air at 500° C. for one hour.

II. The Topcoat

B. One component of the topcoat is prepared by impregnating an activated alumina powder having a surface area of 130 m²/g with an aqueous solution of a methylethanolamine complex of $Pt+^4$ hydroxide, whose formula may be expressed informally as $(MEA)_2Pt(OH)_6$, wherein MEA represent methylethanolamine. The complex solution is of a concentration to give the platinum metal loading described below. The platinum compound-impregnated activated alumina is milled in a ball mill in the presence of acetic acid to chemically fix the platinum on the alumina support, providing a first alumina support having a platinum catalytic component dispersed thereon in the amount of 1.93 weight percent, measured as platinum metal and based on the weight of the platinum plus the alumina support. This first alumina support is not thermally stabilized, that is, it is substantially free of stabilizing ceria and other known thermal stabilizers such as rare earth metaloxides generally.

C. A second platinum-containing component is supported on an alumina-stabilized bulk ceria which is prepared by impregnating a cerium oxide powder with an aqueous solution of aluminum nitrate. The impregnated cerium oxide powder is then dried in air at 125° C. and then calcined in air at about 400° C. to give a ceria support having 2.5 weight percent alumina (measured as $Al_2O_3$) on ceria. This alumina-stabilized ceria support is then impregnated with a platinum catalytic component and fixed, using the same solution and technique as in Step B, to provide on the ceria support an identical loading of 1.93 weight percent platinum catalytic component, measured as platinum metal and based on the weight of platinum plus the alumina support.

D. A second alumina support having a rhodium catalytic component dispersed thereon is prepared by impregnating an activated alumina powder having a surface area of 130 m²/g with an aqueous solution of rhodium nitrate of a concentration to give the rhodium catalytic component loading described below. The impregnated alumina is dried in air at 125° C., then calcined in air at 450° C. to thermally fix the rhodium on the support and give an alumina support which is substantially free of ceria (or other stabilizing compounds) and contains thereon 0.39 weight percent rhodium, measured as the metal and based on the weight of rhodium plus the alumina support.

E. A zirconia/dispersed ceria phase support is prepared by impregnating a commercially available zirconia powder with an aqueous solution of cerium nitrate, $Ce(NO_3)_3$ of a concentration to give the ceria loading described below. The impregnated zirconia support is dried in air at 125° C. and then calcined in air at 450° C. The resultant zirconia support material contains 10 percent by weight cerium oxide measured as $CeO_2$ and based on the weight of zirconia plus ceria. This support is impregnated with an aqueous solution of rhodium nitrate of a concentration to give the rhodium loading described below. The impregnated zirconia support is dried in air at 125° C. and the dried support is calcined in air at 450° C. to provide a zirconia/dispersed ceria support having thereon 0.39 weight percent rhodium, measured as the metal and based on the weight of rhodium plus the zirconia a support.

F. A cordierite powder was prepared by comminuting cordierite substrate scrap material.

G. Each of the five topcoat components of Steps B through F are milled separately in ball mills in aqueous media to a particle size range such that at least 90% by weight of the particles are of a diameter less than 12 microns. The milled powders slurries are then blended together in proportions to provide a coating slip.

H. The cordierite substrates having the undercoat affixed thereto, obtained in Step A, are dipped into the coating slip of Step G and excess slurry is blown from the cells of the substrates with compressed air. The thus coated substrates are dried in air at 125° C. and then calcined in air at 450° C. for one hour to provide a catalyst composition containing a topcoat and an undercoat of dried, adherent catalytic material ("washcoat") thereon. The finished catalyst composition of Example 1 comprises 0.70 g/in$^3$ of platinum-containing alumina-stabilized ceria support, 0.30 g/in$^3$ of platinum-containing alumina support, 0.50 g/in$^3$ of rhodium-containing alumina support, 0.50 g/in$^3$ of rhodium-containing zirconia/dispersed ceria support, and 0.20 g/in$^3$ of ground cordierite.

EXAMPLE 3

In order to compare the results obtained using the combination of a low ignition temperature catalyst as the upstream catalytic member with a downstream catalyst having a higher ignition temperature but higher conversion efficiencies at operating temperature than the upstream catalyst, a catalytic converter denominated Converter A was assembled, utilizing as the upstream catalyst member Catalyst I of Example 1 and as the downstream catalytic member Catalyst II of Example 2. The terms "upstream" and "downstream" are used as sensed in the direction of exhaust gas flow through the catalytic converter. That is, the gaseous exhaust stream flows in series first through the "upstream" catalyst (Catalyst I) and then through the "downstream" catalyst (Catalyst II).

A first comparative converter was prepared utilizing as both the upstream and downstream catalyst material Catalyst I of Example I; this comparative converter was denominated Converter B. A second comparative converter was prepared utilizing as both the upstream and downstream catalyst material Catalyst II of Example 2; this converter was denominated Converter C. All three Converters, A, B and C, contained the same total amount and type of platinum group metal catalytic components, in the same proportions of Pt and Rh.

All three converters were engine-aged for 24 hours on a standardized four-hour aging cycle in which engine exhaust gas from an engine operating with a gasoline containing 12 milligrams Pb per gallon is flowed through the catalyst. The engine is operated at idle, high and cruise conditions including selected air to fuel ratios and varying temperatures up to a maximum temperature of about 760° to 815° C. Each was then evaluated on a Volvo 740 GLE automobile equipped with a four cylinder engine using the Federal Test Procedure as prescribed in Part 86 of 40 Code of Federal Regulations (40 CFR 86). The Federal Test Procedure ("FTP") results, expressed as total weighted grams per mile of CO, hydrocarbon (HC) and NO$_x$ emissions escaping from the catalyst, are shown below. The FTP has three test phases, a cold transient phase, a cold stabilized phase and a hot transient phase. The "total weighted" results are a weighted average of the three test phases. The results of analysis of the exhaust gas obtained from each of Converters A, B and C is set forth in the following Table.

TABLE

| Converter | Total Weighted Grams Per Mile Of Operation | | |
|---|---|---|---|
| | HC | CO | NO$_x$ |
| A | 0.17 | 0.84 | 0.10 |
| B (Comparative) | 0.32 | 1.44 | 0.24 |
| C (Comparative) | 0.31 | 1.29 | 0.22 |

The data of the Table clearly shows the markedly superior performance of Converter A, utilizing a catalyst composition in accordance with the present invention. The grams of hydrocarbon per mile of operation escaping from Converter A are only slightly more than half of that from Converters B or C. The amount of unconverted CO escaping from Converter A is only about ⅔ or less than that escaping from Converters B and C and the amount of NO$_x$ escaping from Converter A is less than half that escaping from Converters B and C.

The enhanced performance of the catalyst system in accordance with the present invention is well illustrated by the figure of the drawing in which conversion efficiency is shown on the abscissa extending from 0% at the origin to 100% and temperature is shown on the ordinate axis, increasing in the direction moving away from the origin, as indicated by the arrow parallel to the ordinate axis. I$_1$ shows the ignition temperature for Catalyst I and I$_2$ shows the ignition temperature for Catalyst II. It is noted that Catalyst I demonstrates a better (lower) ignition temperature than does Catalyst II. However, once operating temperature (T$_o$) is reached, it is seen that Catalyst II attains a higher percentage conversion of the noxious pollutants than does Catalyst I. The dash-dot curve shows the combined affect attained by utilizing Catalyst I as an up-stream catalyst or Catalyst II as a downstream catalyst. The combined Catalysts I and II are seen to provide the benefit of the lower ignition temperature I$_1$ for start-up operation and a higher over-all conversion once operating temperature has been attained.

It is of course not necessary in the practice of the present invention to utilize the specific catalysts disclosed in the specific embodiment illustrated by Example 3. Any combination of an upstream catalyst having a significantly lower ignition temperature than a downstream catalyst, which downstream catalyst has a significantly higher conversion efficiency than the upstream catalyst within a normal operating temperature range, e.g., 400° to 800° C., may be utilized to attain the benefits of the present invention.

Further, it should be understood that stoichiometric operation is not required for successful utilization of the catalyst. Reference to a stoichiometric exhaust gas (an exhaust gas produced by an engine operating with a stoichiometric air to fuel ratio) in the claims is for purposes of definition. As those skilled in the art are aware, successful TWC treatment of an exhaust gas is attainable within a "window" around stoichiometric operation. This window for commercially available gasoline may extend ±1 or, preferably, ±0.5, about the stoichiometric A/F ratio for gasoline of 14.65.

While the invention has been described in detail with respect to specific preferred embodiments thereof, it will be apparent to those skilled in the art upon a reading and understanding of the foregoing, that variations thereto may be made which variations nonetheless lie within the spirit and scope of the invention and the appended claims.

What is claimed is:

1. A method of substantially simultaneously converting HC, CO and $NO_x$ pollutants contained in a gaseous stream, the method comprising:

(a) flowing the gaseous stream through a first catalyst zone and therein contacting the gaseous stream with a first catalyst member comprising a first catalytic material having an ignition temperature for substantially simultaneous conversion of HC, CO and $NO_x$, when the gaseous stream is a substantially stoichiometric exhaust gas mixture, which is lower than the corresponding ignition temperature of a second catalytic material defined below, the gaseous stream being introduced into the first catalyst zone at a temperature at or above the ignition temperature of the first catalytic material but below an operating temperature range, defined below, to convert within said first catalyst zone some, but less than all, of each of the HC, CO and $NO_x$ content of the gaseous stream to innocuous substances and thereby increase the temperature of the gaseous stream, and (b) flowing the gaseous stream from the first catalyst zone to a second catalyst zone and wherein contacting the gaseous stream with a second catalyst member comprising a second catalytic material having a higher conversion efficiency for substantially simultaneous conversion of HC, CO and $no_x$ at temperature within the operating temperature range than does the first catalytic material, the gaseous stream being contacted with the second catalytic material at a temperature within the operating temperature range to substantially simultaneously convert at least some of the remaining HC, CO and $NO_x$ to innocuous substances.

2. The method of claim 1 wherein the ignition temperature of the first catalytic material is less than about 400° C. and contacting the gaseous stream with the second catalyst member within an operating temperature range of from about 400° C. to 800° C.

3. The method of claim 2 wherein the ignition temperature of the first catalytic material is not more than about 350° C.

4. A method of substantially simultaneously converting HC, CO and $NO_x$ pollutants contained in a gaseous stream, the method comprising:

(a) flowing the gaseous stream through a first catalyst zone and therein contacting the gaseous stream with a first catalyst member comprising a first catalytic material having an ignition temperature for substantially simultaneous conversion of HC, CO and $NO_x$, when the gaseous stream is a substantially stoichiometric exhaust gas mixture, which is lower than the corresponding ignition temperature of a second catalytic material defined below, the gaseous stream being introduced into the first catalyst zone at a temperature at or above the ignition temperature of the first catalytic material but below an operating temperature range, defined below, to convert within said first catalyst zone some, but less than all, of each of the HC, CO and $NO_x$ content of the gaseous stream to innocuous substances and thereby increase the temperature of the gaseous stream, wherein the first catalytic material comprises a platinum catalytic component dispersed on a refractory metal oxide support and a rhodium catalytic component dispersed on a refractory metal oxide support, and (b) flowing the gaseous stream from the first catalyst zone to a second catalyst zone and therein contacting the gaseous stream with a second catalyst member comprising a second catalytic material having a higher conversion efficiency for substantially simultaneous conversion of HC, Co and $NO_x$ at temperatures within the operating temperature range than does the first catalytic material, the gaseous stream being contacted with the second catalytic material at a temperature within the operating temperature range to substantially simultaneously convert at least some of the remaining HC, CO and $NO_x$ to innocuous substances, wherein the second catalytic material comprises a rhodium catalytic component disposed on a zirconia/dispersed ceria support and a platinum catalytic component disposed on a refractory metal oxide support.

5. The method of claim 4 wherein (a) the first platinum catalytic component in the first catalytic material is dispersed on a first activated alumina support, the rhodium catalytic component is dispersed on a second activated alumina support, and wherein the first catalytic material further comprises a second platinum catalytic component disposed on a ceria support, and (b) the second catalytic material further comprises a rhodium catalytic component disposed on a third activated alumina support, a third platinum catalytic component disposed on a fourth activated alumina support, and a fourth platinum catalytic component disposed on a ceria support.

6. The method of claim 4 or claim 5 wherein the ignition temperature of the first catalytic material is less than about 400° C. and contacting the gaseous stream with the second catalyst member within an operating temperature range of from about 400° C. to 800° C.

7. A method of substantially simultaneously converting HC, CO and $NO_x$ pollutants contained in a gaseous stream, the method comprising:

(a) flowing the gaseous stream through a first catalyst zone and therein contacting the gaseous stream with a first catalyst member comprising a first catalytic material having an ignition temperature for substantially simultaneous conversion of HC, CO and $NO_x$, when the gaseous stream is a substantially stoichiometric exhaust gas mixture, which is lower than the corresponding ignition temperature of a second catalytic material defined below, the gaseous stream being introduced into the first catalyst zone at a temperature at or above the ignition temperature of the first catalytic material but below an operating temperature range, defined below, to convert within said first catalyst zone some, but less than all, of each of the HC, CO and $No_x$ content of the gaseous stream to innocuous substances and thereby increase the temperature of the gaseous stream; and (b) flowing the gaseous stream from the first catalyst zone to a second catalyst zone and therein contacting the gaseous stream with a second catalyst member a second catalytic material having a higher conversion efficiency for substantially simultaneous conversion of HC, CO and $NO_x$ at temperatures within the operating temperature range than does the first catalytic material, the gaseous stream being contacted with the second catalytic material at a temperature within the operating temperature range to substantially simultaneously convert at least some of the remaining HC, CO and $NO_x$ to innocuous substances; wherein the first catalyst material comprises a first platinum catalytic component dispersed on a first activated alumina support, a rhodium catalytic component dispersed on a second activated alumina support, and a second platinum catalytic component disposed on a ceria support, and wherein the second catalytic material comprises a second rhodium catalytic component dispersed on a zirconia/dispersed ceria support, a third rhodium catalytic component disposed on a third activated alumina support, a third platinum catalytic component disposed on a fourth activated alumina support, and a fourth platinum catalytic component disposed on a ceria support.

8. The method of claim 7, wherein there is included in one or both of the first and second catalyst materials a minor amount of a high-porosity refractory metal oxide which is substantially free of catalytic metal components and increases the porosity of the catalytic material in which it is included.

9. The method of claim 7 wherein the ignition temperature of the first catalytic material is less than about 400° C. and contacting the gaseous stream with the second catalyst member within an operating temperature range of from about 400° C. to 800° C.

10. The method of claim 9 wherein the ignition temperature of the first catalytic material is not more than about 350° C.

* * * * *